US008683465B2

(12) United States Patent
Burckart et al.

(10) Patent No.: US 8,683,465 B2
(45) Date of Patent: Mar. 25, 2014

(54) VIRTUAL IMAGE DEPLOYMENT WITH A WARM CACHE

(75) Inventors: Erik J. Burckart, Raleigh, NC (US); Andrew J. Ivory, Wake Forest, NC (US); Todd E. Kaplinger, Raleigh, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1048 days.

(21) Appl. No.: 12/642,571

(22) Filed: Dec. 18, 2009

(65) Prior Publication Data

US 2011/0148895 A1 Jun. 23, 2011

(51) Int. Cl.
*G06F 9/455* (2006.01)
*G06F 15/167* (2006.01)
*G06F 15/16* (2006.01)
*G06F 13/00* (2006.01)
*G06F 13/28* (2006.01)

(52) U.S. Cl.
USPC ............... 718/1; 709/213; 709/227; 711/133; 711/128; 711/144; 711/119

(58) Field of Classification Search
USPC .......................................................... 718/1
See application file for complete search history.

(56) References Cited

U.S. PATENT DOCUMENTS

| 4,843,542 | A | 6/1989 | Dashiell et al. |
| 5,748,961 | A * | 5/1998 | Hanna et al. ................. 717/145 |
| 6,185,617 | B1 * | 2/2001 | Housel et al. ................. 709/227 |
| 6,233,244 | B1 * | 5/2001 | Runaldue et al. ............. 370/412 |
| 6,571,324 | B1 * | 5/2003 | Elkington et al. ............ 711/162 |
| 6,983,315 | B1 * | 1/2006 | Crutcher ....................... 709/220 |
| 7,631,145 | B1 * | 12/2009 | Alben ........................... 711/118 |
| 7,640,356 | B2 | 12/2009 | Ananthakrishnan et al. |
| 7,711,903 | B2 * | 5/2010 | Day et al. ...................... 711/133 |
| 7,809,893 | B2 * | 10/2010 | Koski et al. ................... 711/144 |
| 8,024,728 | B2 * | 9/2011 | Anand et al. ..................... 718/1 |
| 8,065,676 | B1 * | 11/2011 | Sahai et al. ...................... 718/1 |
| 8,108,855 | B2 * | 1/2012 | Dias et al. ..................... 717/177 |
| 8,141,058 | B2 * | 3/2012 | Berg et al. .................... 717/131 |
| 8,181,174 | B2 * | 5/2012 | Liu .................................. 718/1 |
| 8,261,026 | B2 * | 9/2012 | Klems et al. ................. 711/148 |
| 8,467,354 | B1 * | 6/2013 | Jerkunica et al. ............ 370/338 |
| 2004/0162972 | A1 | 8/2004 | Iacobovici et al. |
| 2006/0155931 | A1 | 7/2006 | Birrell et al. |
| 2006/0184937 | A1 | 8/2006 | Abels et al. |
| 2007/0006218 | A1 * | 1/2007 | Vinberg et al. ............... 717/174 |
| 2007/0106716 | A1 * | 5/2007 | Corrie ........................... 707/206 |
| 2007/0234324 | A1 | 10/2007 | Ananthakrishnan et al. |

(Continued)

OTHER PUBLICATIONS

United States Patent and Trademark Office, Notice of Allowance for U.S. Appl. No. 13/434,761, Dec. 10, 2012, pp. 1-19, Alexandria, VA, USA.

*Primary Examiner* — Lewis A Bullock, Jr.
*Assistant Examiner* — Kevin X Lu
(74) *Attorney, Agent, or Firm* — Lee Law, PLLC; Christopher B. Lee

(57) ABSTRACT

A cache image including only cache entries with valid durations of at least a configured deployment date for a virtual machine image is prepared via an application server for the virtual machine image. The virtual machine image is deployed to at least one other application server as a virtual machine with the cache image including only the cache entries with the valid durations of at least the configured deployment date for the virtual machine image.

20 Claims, 5 Drawing Sheets

(56) References Cited

U.S. PATENT DOCUMENTS

| | | |
|---|---|---|
| 2008/0082769 A1 | 4/2008 | Bouchou et al. |
| 2008/0155223 A1* | 6/2008 | Hiltgen et al. ............... 711/173 |
| 2009/0055468 A1* | 2/2009 | Burckart et al. ............. 709/203 |
| 2009/0157970 A1* | 6/2009 | Kornegay et al. ............ 711/130 |
| 2009/0210641 A1 | 8/2009 | Osborne et al. |
| 2009/0222798 A1* | 9/2009 | Iguchi et al. ................. 717/137 |
| 2009/0282196 A1* | 11/2009 | Petev et al. .................... 711/134 |
| 2009/0288082 A1* | 11/2009 | Nazeer et al. ..................... 718/1 |
| 2010/0199285 A1* | 8/2010 | Medovich ..................... 718/104 |
| 2010/0229185 A1* | 9/2010 | Howarth ....................... 719/318 |
| 2012/0023319 A1* | 1/2012 | Chin et al. ......................... 713/2 |

* cited by examiner

VIRTUAL IMAGE DEPLOYMENT WITH A WARM CACHE

BACKGROUND

The present invention relates to virtual image deployment. More particularly, the present invention relates to virtual image deployment with a warm cache.

Application servers host applications for use by user computing devices that access the application servers via a network connection. As such, application servers provide application interaction capabilities for user computing devices.

BRIEF SUMMARY

A method includes preparing, via an application server for a virtual machine image, a cache image comprising only cache entries with valid durations of at least a configured deployment date for the virtual machine image; and deploying the virtual machine image to at least one other application server as a virtual machine with the cache image comprising only the cache entries with the valid durations of at least the configured deployment date for the virtual machine image.

A system includes a memory; and a processor associated with an application server programmed to: prepare a cache image within the memory comprising only cache entries with valid durations of at least a configured deployment date for a virtual machine image; and deploy the virtual machine image to at least one other application server as a virtual machine with the cache image comprising only the cache entries with the valid durations of at least the configured deployment date for the virtual machine image.

A computer program product includes a computer readable storage medium including computer readable program code, wherein the computer readable program code when executed on a computer causes the computer to: prepare a cache image comprising only cache entries with valid durations of at least a configured deployment date for a virtual machine image; and deploy the virtual machine image to at least one other computer as a virtual machine with the cache image comprising only the cache entries with the valid durations of at least the configured deployment date for the virtual machine image.

DETAILED DESCRIPTION

Figure 1:
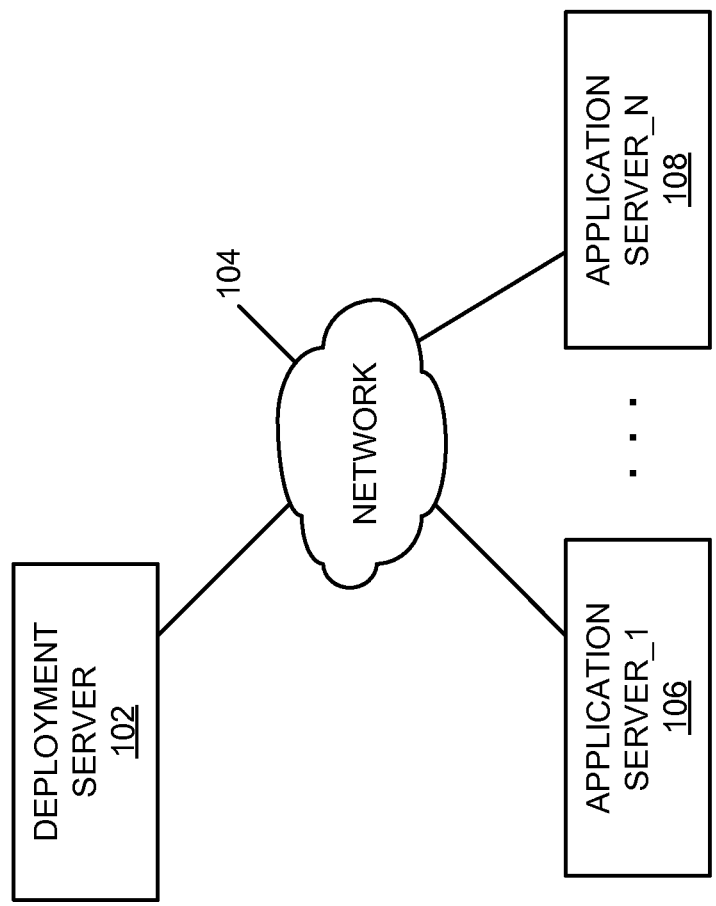
FIG. 1 is a block diagram of an example of an implementation of a system for virtual image deployment with a warm cache according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides virtual image deployment with a warm cache. Based upon the present subject matter, an application server may be deployed with a pre-warmed cache with no wait time for cache-hit performance to be realized. The present subject matter allows for creation of a single image with pre-loaded cache values for an application server environment. Cache image data recording (e.g., storage) is performed to create the pre-warmed cache image as a virtual image. Filtering of cache data recording may be performed to record only cache entries with a valid useful duration beyond a target deployment date for the virtual image. As an additional option, a server may be instructed to perform incremental invalidation of data within the pre-recorded cache image during deployment to the server to remove invalid data entries. Incremental invalidation may also be performed by the deploying server in response to a change in the deployment date for the virtual image. Virtual image deployment performance may further be improved by including pre-compiled bytecode, such as in the form of just-in-time (JIT) tables of bytecode, and shared classes in the pre-warmed cache image. The present subject matter additionally provides for deployed-cache performance verification and feedback to improve cache warming for virtual images over time.

Multiple virtual machines (VMs), also referred to as application server instances, may be created in multiple application servers using the pre-warmed cache deployed with valid data, and optionally with pre-compiled bytecode and shared classes. The pre-warmed cache image is capable of allowing the deploying server to create multiple application server instances that do not require conventional cache break-in time. The starting point for the cache will further be consistent across all deployed application servers. As such, performance numbers for a newly deployed application server will approach performance numbers for an application server with multiple days of uptime. Accordingly, by capturing the cache image and deploying the virtual machine with the pre-warmed cache, several days of increased cache performance may be achieved at deployment by reducing the time conventionally required to get a cache for a virtual machine warmed up.

In one implementation, the present subject matter provides for preparing, via an application server for a virtual machine image, a cache image including only cache entries with valid durations of at least a configured deployment date for the virtual machine image. The present subject matter also provides for deploying the virtual machine image to at least one other application server as a virtual machine with the cache image including only the cache entries with the valid durations of at least the configured deployment date for the virtual machine image. As an alternative, in response to determining that the configured deployment date for the virtual machine image has changed, the application server may either determine the valid duration associated with each cache entry within the cache image and delete any of the cached entries determined not to have a valid duration of at least the changed configured deployment date for the virtual machine image, or it may instruct at least one other application server to invalidate any cache entries that do not have a valid duration of at least the changed configured deployment date for the virtual machine image during deployment of the virtual image.

Regarding recording of data for a virtual image with a valid duration of at least the target deployment date, it is noted that some cache entries have a time at which they expire or become invalid. The expiration date or valid duration may be configured as a number of days, hours, or other unit of time until deployment of the pre-warmed cache image. Based upon a configured expiration date or valid duration for cached data, a given cache entry may expire before the virtual machine loads. Improved performance for cache warming and for loading of virtual images may be improved by only capturing cache entries that expire after the virtual image is deployed. It is additionally noted that bandwidth may be conserved by recording and deploying only valid data within the pre-warmed cache.

Alternatively, the expiration date or valid duration associated with each cache entry may also be stored within the cache image to allow for incremental invalidation of data at deployment. When in record mode, the deploying server may index the cache or individual data elements based on the expiration time. In such an implementation, each server that loads a virtual image may make certain that all cache entries are valid. The respective server may purge cache entries that are no longer valid based upon the expiration date, or the valid duration associated with each cache entry may also be stored within the cache image. As such, when a virtual image is deployed with this cache, the cache may very quickly and efficiently be purged of expired entries based upon the expiration indexing of the cache or of individual cache entries.

It should be noted that the regular application server that is performing the cache warming is often not a virtualized machine. In such an implementation, the deployment date for the pre-warmed cache image may be based upon statistics of likely deployment windows or timeframes, and valid duration for cache entries may be based upon the available statistics.

Based upon the described options for incremental invalidation, incremental invalidation may be a configured option for deployment of the pre-warmed cache. For example, if the cache image is deployed on time and if only valid entries with duration equal to or longer than the deployment time have been recorded, then no incremental invalidation will be required on either the deploying server or on deployed machine. Alternatively, a configuration option may be provided for instructing the deployed server to perform incremental invalidation of cache entries when loading the cache image. As another alternative, the deploying server may be configured to perform incremental invalidation in response to changes in the target deployment date for the cache image. As yet another option, the virtual machine itself may be configured to process data in its own pre-warmed cache and verify that all data is current or to perform incremental invalidation of expired data. Many other options are possible for incremental invalidation and verification of deployed pre-warmed cache images and all are considered within the scope of the present subject matter.

Warming of the cache may be performed, for example, by automatic population of the virtual cache image with data. Automated population of the virtual cache image may be performed in a variety of ways. For example, population of the virtual cache image may be performed by execution of an automated script that accesses (e.g., "hits") every data element that is intended to be in the pre-warmed cache image. Alternatively, population of the virtual cache image may be performed by loading the virtual cache image with a known or intended data set for deployment to create a virtual cache image with a pre-populated set of cache data. As another example of population of the virtual cache image, real user load may be applied to populate the virtual cache image. Many other possibilities exist for populating the virtual cache image and all are considered within the scope of the present subject matter. Further, pre-compiled bytecode may be generated and shared classes may be identified. The pre-compiled bytecode and shared classes may be stored to the pre-warmed cache image to further increase deployment performance of the cache image.

As described above, in addition to saving in-memory cache, Java®-based or other interpretive application server virtual images may also store other items like a just-in-time (JIT) table or shared classes. Storage of JIT tables and/or shared classes may further increase performance of the application server instance at deployment time and may further eliminate a need for a performance break-in period. It should be noted that the JIT table and shared class cache are Java Virtual Machine (JVM) optimizations that may improve performance of a given JVM. The JVM accumulates the JIT table and shared classes cache over time. As such, by accumulating on the deploying server and by adding the JIT table and shared classes cache to a deployed virtual image, the deployed application server instance will not need to recreate the JIT table and the shared classes cache over time after deployment. It should further be noted that other data or executable code that builds up over time during execution may be added to make them "pre-warmed" at deployment time as well. As such, any such addition to a pre-warmed cache as described herein is considered within the scope of the present subject matter.

The virtual image deployment with a warm cache described herein may be performed in real time to allow prompt recording of cache contents and automated deployment of a virtual image with a warm cache. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for virtual image deployment with a warm cache. A deployment server 102 communicates via a network 104 with an application server_1 106 through an application server_N 108.

As will be described in more detail below in association with FIG. 2 through FIG. 5, the deployment server 102 provides automated virtual image deployment with a warm cache. The automated virtual image deployment with a warm cache is based upon recording entries within a virtual cache image that have a valid duration of at least a target deployment date for the virtual cache image.

It should also be noted that the deployment server 102 may be any computing device capable of processing information as described above and in more detail below. For example, the deployment server 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
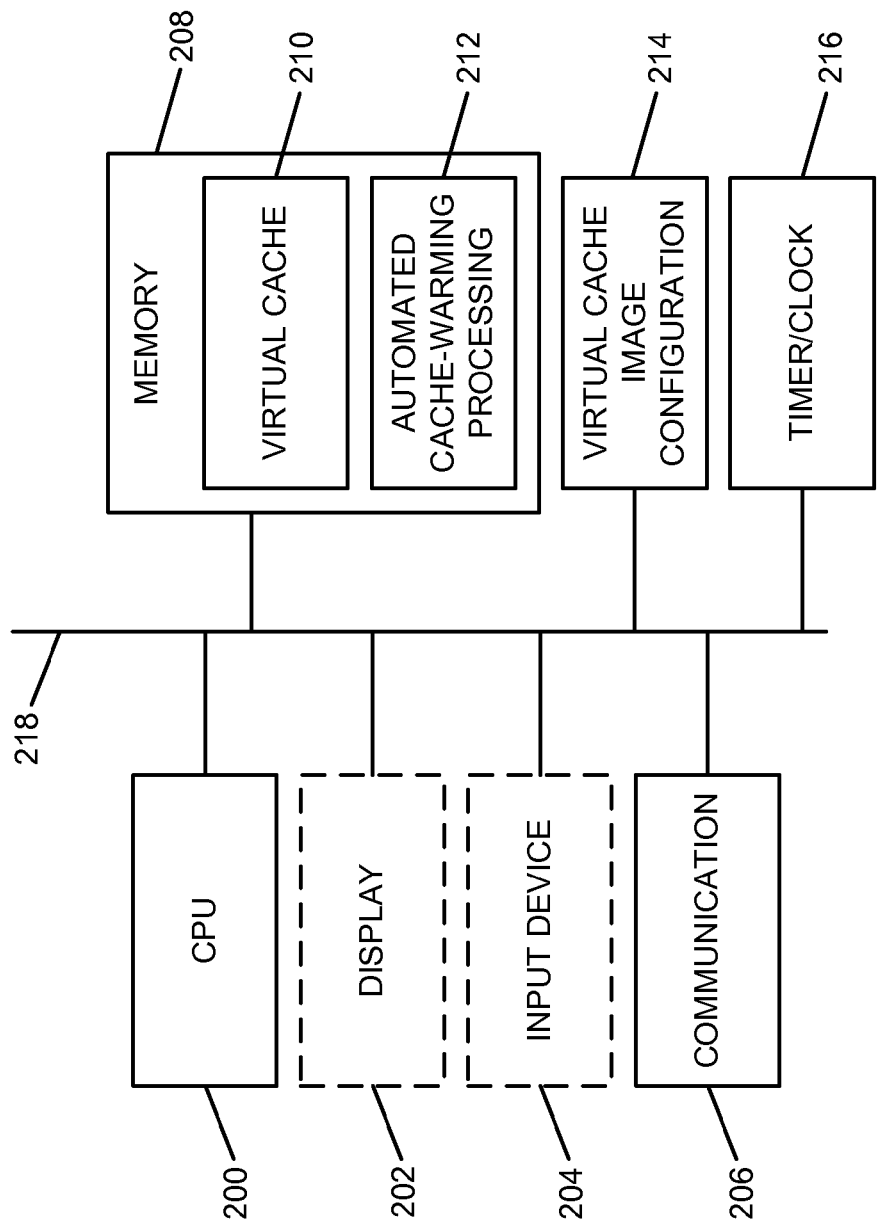
FIG. 2 is a block diagram of an example of an implementation of a deployment server capable of performing automated virtual image deployment with a warm cache according to an embodiment of the present subject matter.

FIG. 2 is a block diagram of an example of an implementation of the deployment server 102 capable of performing automated virtual image deployment with a warm cache. A central processing unit (CPU) 200 provides computer instruction execution, computation, and other capabilities within the deployment server 102. A display 202 provides visual information to a user of the deployment server 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they may be optional components for the deployment server 102 for certain implementations. Accordingly, the deployment server 102 may operate as a completely automated embedded device without user configurability or feedback. However, the deployment server 102 may also provide user feedback and configurability via the display 202 and the input device 204, respectively.

A communication module 206 provides interconnection capabilities that allow the deployment server 102 to communicate with other modules within the system 100, such as the application server_1 106 through the application server_N 108, to deploy virtual images. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a virtual cache storage area 210 that stores a virtual cache image for the deployment server 102. As will be described in more detail below, the virtual cache image stored within the virtual cache storage area 210 is used to deploy virtual machines to one or more application servers, such as the application server_1 106 through the application server_N 108. The memory 208 also includes an automated cache-warming processing storage area 212 that stores one or more automated processing sequences, such as an automated cache-warming script, a known or intended data set for deployment to create a virtual cache image with a pre-populated set of cache data, and real user load data, which may be applied to populate the virtual cache image. The automated cache-warming processing stored within the automated cache-warming processing storage area 212 may be executed by the deployment server 102 to pre-warm the virtual cache for deployment. The memory 208 may further store information, such as a configured deployment date or a changed configured deployment date, for a virtual cache image and virtual machine image. Other information may be stored within the memory 208 as appropriate for a given implementation.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A virtual cache image configuration module 214 is also illustrated. The virtual cache image configuration module 214 provides for automated population of virtual cache images and for deployment of virtual cache images for the deployment server 102, as described above and in more detail below. The virtual cache image configuration module 214 implements the automated virtual image deployment with a warm cache of the deployment server 102.

Though the virtual cache image configuration module 214 is illustrated as a component-level module for ease of illustration and description purposes, it should be noted that the virtual cache image configuration module 214 may include any hardware, programmed processor(s), and memory used to carry out the functions of this module as described above and in more detail below. For example, the virtual cache image configuration module 214 may include additional controller circuitry in the form of application specific integrated circuits (ASICs), processors, and/or discrete integrated circuits and components for performing communication and electrical control activities associated with the respective devices. Additionally, the virtual cache image configuration module 214 may also include interrupt-level, stack-level, and application-level modules as appropriate. Furthermore, the virtual cache image configuration module 214 may include any memory components used for storage, execution, and data processing for performing processing activities associated with the module.

It should also be noted that the virtual cache image configuration module 214 may form a portion of other circuitry described without departure from the scope of the present subject matter. Further, the virtual cache image configuration module 214 may alternatively be implemented as an application stored within the memory 208. In such an implementation, the virtual cache image configuration module 214 may include instructions executed by the CPU 200 for performing the functionality described herein. The CPU 200 may execute these instructions to provide the processing capabilities described above and in more detail below for the deployment server 102. The virtual cache image configuration module 214 may form a portion of an interrupt service routine (ISR), a portion of an operating system, a portion of a browser application, or a portion of a separate application without departure from the scope of the present subject matter.

A timer/clock module 216 is illustrated and used to determine timing and date information, such as a configured deployment date, or a change to a configured deployment date, for a virtual cache image, as described above and in more detail below. As such, the virtual cache image configuration module 214 may utilize information derived from the timer/clock module 216 for information processing activities, such as the virtual image deployment with a warm cache described herein.

The CPU 200, the display 202, the input device 204, the communication module 206, the memory 208, the virtual cache configuration module 214, and the timer/clock module 216 are interconnected via an interconnection 218. The interconnection 218 may include a system bus, a network, or any other interconnection capable of providing the respective components with suitable interconnection for the respective purpose.

While the deployment server 102 is illustrated with and has certain components described, other modules and components may be associated with the deployment server 102 without departure from the scope of the present subject matter. Additionally, it should be noted that, while the deployment server 102 is described as a single device for ease of illustration purposes, the components within the deployment server 102 may be co-located or distributed and interconnected via a network without departure from the scope of the present subject matter. For a distributed arrangement, the display 202 and the input device 204 may be located at a kiosk or other location, while the CPU 200 and memory 208 may be located at a local or remote server. Many other possible arrangements for components of the deployment server 102 are possible and all are considered within the scope of the present subject matter. Accordingly, the deployment server 102 may take many forms and may be associated with many platforms.

It should further be understood that a similar block diagram to the example block diagram illustrated within FIG. 2 for the deployment server 102 may be implemented for an application server, such as the application server_1 106 through the application server_N 108. An additional block diagram is not depicted for brevity, but it is understood that additional and/or complementary processing to the processing described for the deployment server 102 may be performed by a respective application server in associated with deployed virtual images, as described above an in more detail below, based upon the description herein. In such an implementation, an application server may also store and execute an automated script to incrementally invalidate and/or verify cache data during deployment of a virtual image. Such a script may be stored in a memory location similar to the automated cache-warming processing storage area 212 within a memory such as the memory 208. Verification may be performed against an intended or planned pre-populated set of cache data. Further, a virtual image verification module may replace the virtual cache image configuration module 214 to perform the incremental invalidation and/or verification of cache data during deployment of a virtual image. Many additional variations of architecture for an application server are possible and all are considered within the scope of the present subject matter.

Figure 3:
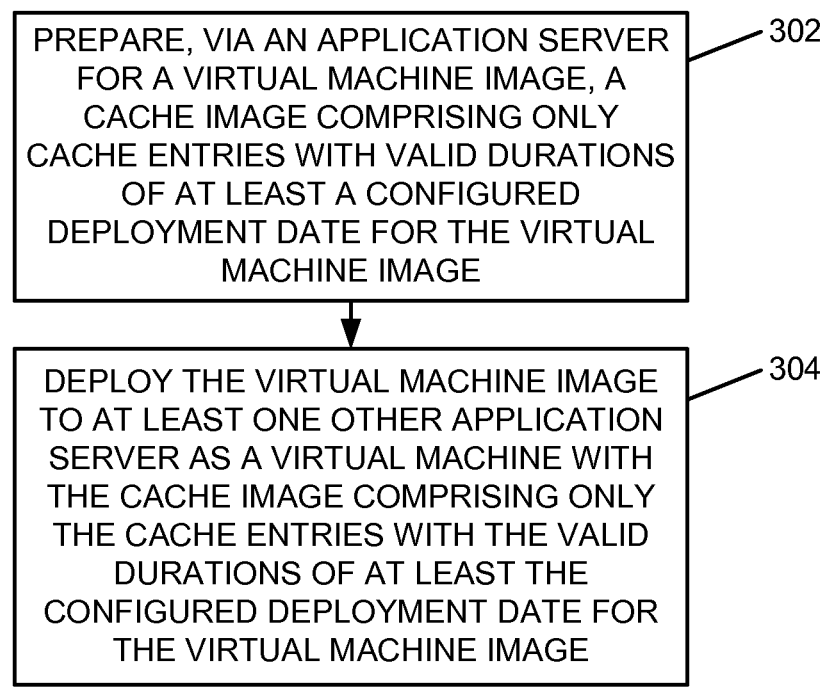
FIG. 3 is a flow chart of an example of an implementation of a process for automated virtual image deployment with a warm cache according to an embodiment of the present subject matter.
Figure 4:
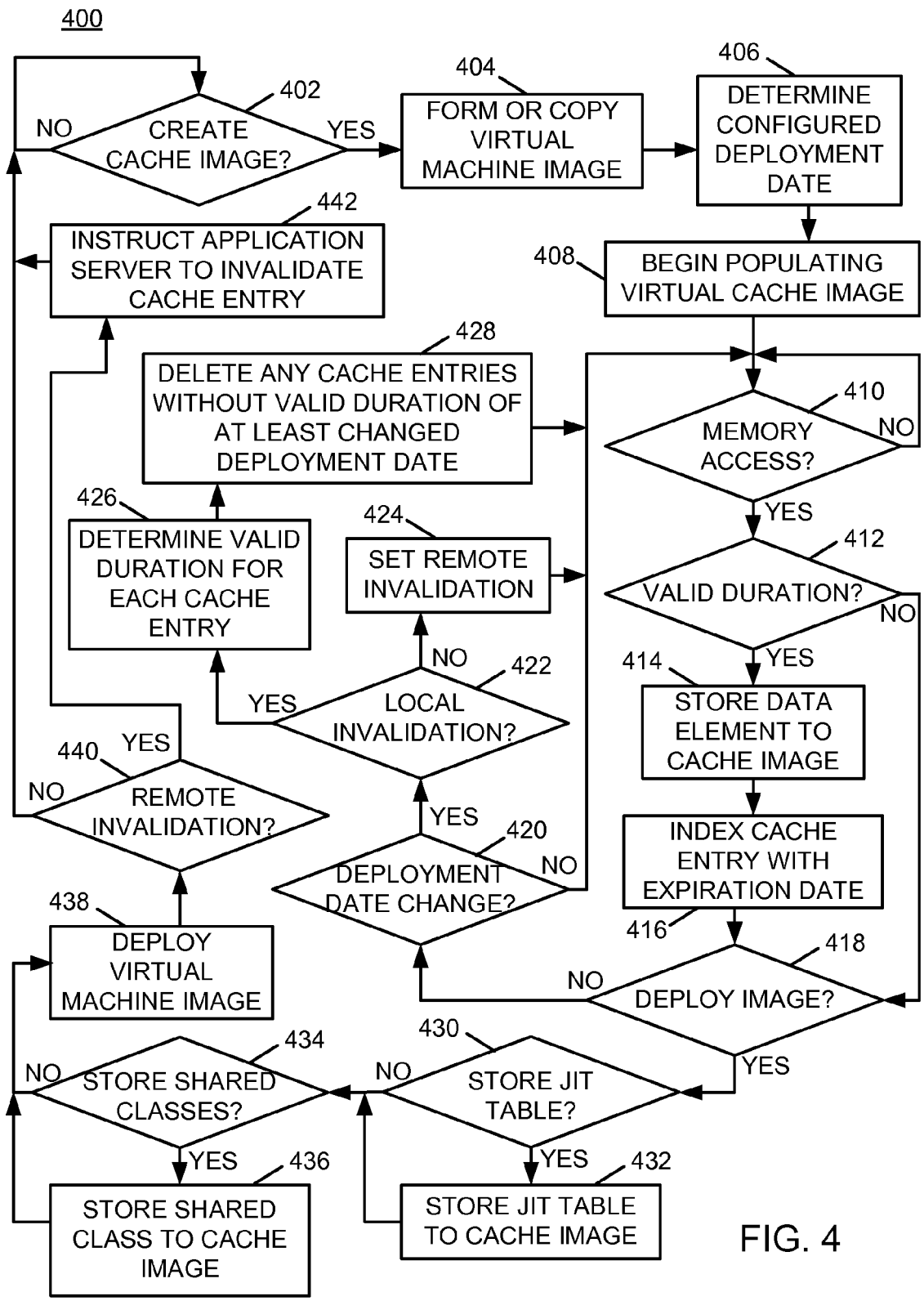
FIG. 4 is a flow chart of an example of an implementation of a process for automated virtual image deployment with a warm cache that builds and deploys a virtual cache image according to an embodiment of the present subject matter.
Figure 5:
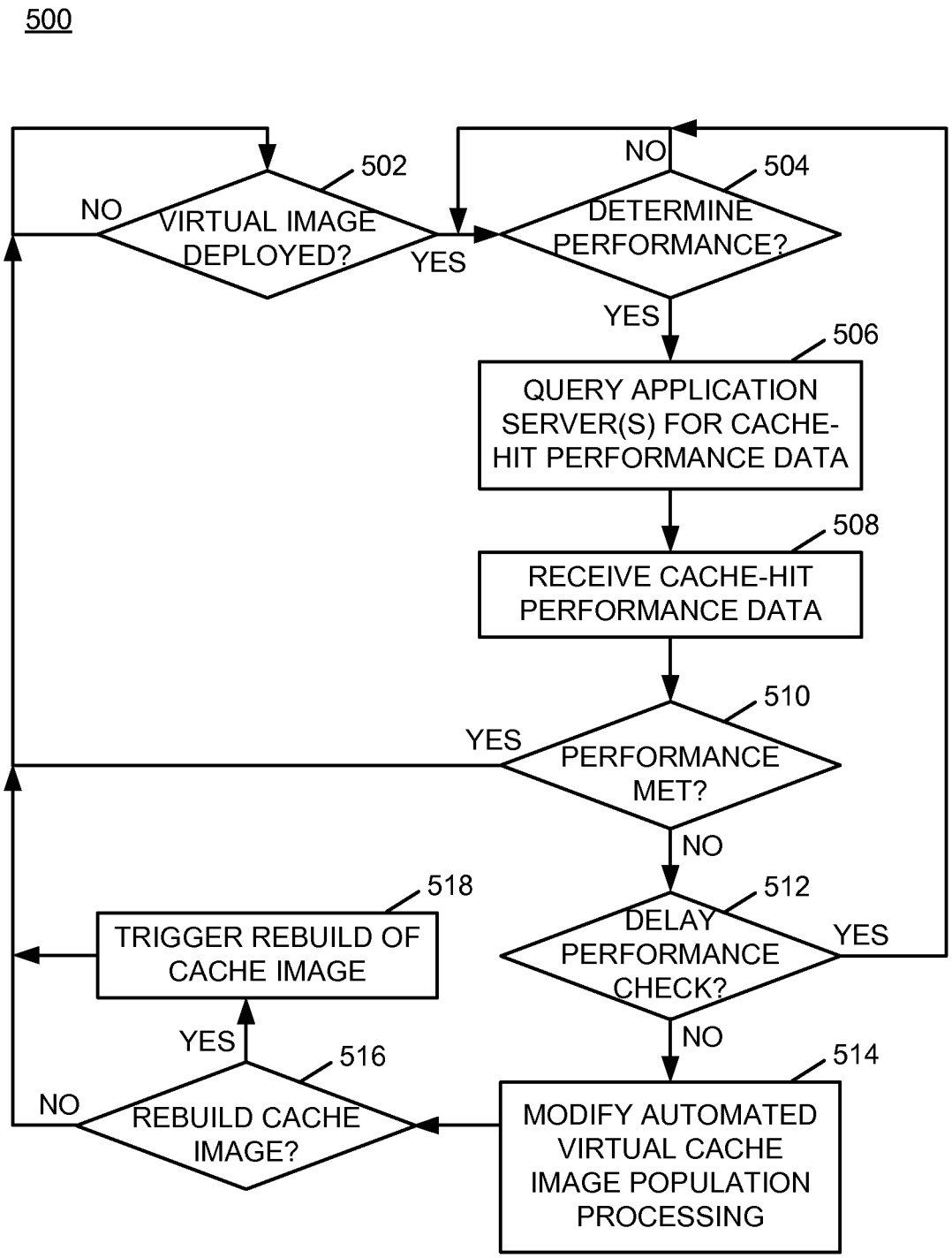
FIG. 5 is a flow chart of an example of an implementation of a process for automated verification of performance for virtual image deployment with a warm cache according to an embodiment of the present subject matter.

FIG. 3 through FIG. 5 below describe example processes that may be executed by devices, such as the deployment server 102, to perform the automated virtual image deployment with a warm cache associated with the present subject matter. Many other variations on the example processes are possible and all are considered within the scope of the present subject matter. The example processes may be performed by modules, such as the virtual cache configuration module 214 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated virtual image deployment with a warm cache. At block 302, the process 300 prepares, via an application server for a virtual machine image, a cache image comprising only cache entries with valid durations of at least a configured deployment date for the virtual machine image. At block 304, the process 300 deploys the virtual machine image to at least one other application server as a virtual machine with the cache image comprising only the cache entries with the valid durations of at least the configured deployment date for the virtual machine image.

FIG. 4 is a flow chart of an example of an implementation of a process 400 for automated virtual image deployment with a warm cache that builds and deploys a virtual cache image. At decision point 402, the process 400 makes a determination as to whether to create a virtual cache image for deployment in association with a virtual machine (VM) image. The determination as to whether to create a virtual cache image may be made based upon a configured time/date or periodicity for creation of a virtual cache image. Additionally, the determination as to whether to create a virtual cache image may be made based upon analysis of a deployed virtual cache image and a determination to rebuild a previously-deployed virtual cache image, as described below in association with FIG. 5.

When a determination is made to create a virtual cache image, the process 400 forms or copies a virtual machine image to be deployed and to be used for warming a virtual cache image for deployment with the virtual machine image at block 404. At block 406, the process 400 determines a configured deployment date for the virtual cache image.

At block 408, the process 400 begins population of the virtual cache image. Population of the virtual cache image may be performed in a variety of ways. For example, population of the virtual cache image may be performed by execution of a memory access script, such as a script stored within the automated cache-warming processing storage area 212 of the memory 208 described above. Such an automated script may be executed and may perform memory access operations for selected data accesses associated the virtual machine image to be deployed. Alternatively, population of the virtual cache image may be performed by loading the virtual cache image with a known or intended data set for deployment to create a virtual cache image with a pre-populated set of cache data. As another example of population of the virtual cache image, real user load may be applied to populate the virtual cache image. Many other possibilities exist for populating the virtual cache image and all are considered within the scope of the present subject matter.

At decision point 410, the process 400 determines whether a memory access has been identified in association with the automated population of the virtual cache image. When a determination is made that a memory access has not been identified, the process 400 iterates until a memory access has been identified. It should be noted that additional decisions and processing for creation of JIT tables and a shared class cache may be performed, though these additional processing options are not illustrated within FIG. 4 due to space limitations. As such, the process 400 may further configure the cache image to store at least one of a JIT table and a shared class.

When a determination is made that a memory access has been identified at decision point 410, the process 400 makes a determination at decision point 412 as to whether data associated with the data element associated with the memory access has a valid duration of at least the configured deployment date for the virtual machine image. The process 400 may determine whether the data element accessed by each memory access operation has a valid duration, an expiration identifier or indicator, or other information, associated with the memory access, such as an indicator associated with automated population of the virtual cache image. For example, such an indicator may be included within an automated cache-warming script or associated with a known or intended data set for deployment of the virtual cache image to create the pre-populated set of data.

When a determination is made that data element associated with the memory access has a valid duration of at least the configured deployment date for the virtual machine image at decision point 412, the process 400 stores the data element to the virtual cache image at block 414. As such, the process 400 stores within the cache image only the data elements determined to have the valid duration of at least the configured deployment date for the virtual machine image. At block 416, the process 400 indexes the stored cache entry with the expiration date representing the valid duration associated with the stored cache entry. As described above, the expiration date for the data element may be used in association with changes to the configured deployment date to incrementally invalidate stored cache entries, or may be used to instruct an application server, such as the application server_1 106 through the application server_N 108, to incrementally invalidate expired cache entries during deployment when the cache image is loaded by the respective application server.

When a determination is made that data element associated with the memory access does not have a valid duration of at least the configured deployment date for the virtual machine image at decision point 412, or upon completion of indexing the stored cache entry with the expiration date at block 416, the process 400 makes a determination at decision point 418 as to whether to deploy the virtual cache image. As described above, the process 400 may determine whether to deploy the virtual cache image by comparison of a present date/time obtained from the timer/clock module 216 with the configured deployment date.

When a determination is made not to deploy the virtual cache image, the process 400 makes a determination at decision point 420 as to whether there has been a change to the configured deployment date. When a determination is made that there has not been a change to the configured deployment date, the process 400 returns to decision point 410 and iterates as described above for each memory access. As also described above, the process 400 may alternatively create JIT compilation entries within a JIT table or shared class caching entries within a shared class cache as appropriate for a given implementation.

When a determination is made at decision point 420 that there has been a change to the configured deployment date, the process 400 makes a determination at decision point 422 as to whether the process 400 is currently configured for local invalidation of cache entries. When a determination is made that the process 400 is currently not configured for local invalidation of cache entries, the process 400 sets a remote validation flag at block 424, continues to decision point 410, and iterates as described above.

When a determination is made at decision point 422 that the process 400 is currently configured for local invalidation of cache entries, the process 400 determines a valid duration associated with each cache entry within the virtual cache image at block 426. At block 428, the process 400 deletes any of the cached entries determined not to have a valid duration of at least the changed configured deployment date for the virtual machine image. The process 400 returns to decision point 410 and iterates as described above.

Returning to the description of decision point 418, when a determination is made to deploy the virtual cache image, the process 400 makes a determination at decision point 430 as to whether to store any created JIT table to the virtual cache image. When a determination is made to store any created JIT table to the virtual cache image, the process 400 stores the JIT table to the virtual cache image at block 432.

When a determination is made not to store any created JIT table to the virtual cache image at decision point 430, or upon completion of storing the JIT table to the virtual cache image at block 432, the process 400 makes a determination at decision point 434 as to whether to store any shared classes cache to the virtual cache image. When a determination is made to store any shared classes cache to the virtual cache image, the process 400 stores the shared classes cache to the virtual cache image at block 436.

When a determination is made not to store any shared classes cache to the virtual cache image at decision point 434, or upon completion of storing the shared classes cache to the virtual cache image at block 436, the process 400 deploys the virtual image to the at least one other application server as a virtual machine at block 438. It should further be noted based upon the configuration options described above, that the process 400 may deploy the virtual image to the at least one other application server as a virtual machine with the cache image including only the cache entries with the valid durations of at least the configured deployment date for the virtual machine image. The process 400 may further deploy the virtual image to the at least one other application server as a virtual machine with the cache image including at least one of a JIT table and a shared classes cache.

At decision point 440, the process 400 makes a determination as to whether to instruct the at least one other application server to perform remote invalidation of cache entries. The processing to determine whether to instruct the at least one other application server to perform remote invalidation of cache entries may be based upon the remote validation flag and may alternatively be based upon the configured option for local invalidation without use of the remote validation flag.

When a determination is made to instruct the at least one other application server to perform remote invalidation of cache entries, the process 400 instructs the at least one other application server to invalidate any cache entries that do not have a valid duration of at least the current deployment date/time at block 442. The current deployment date/time may be an originally configured deployment date/time or may be a changed configured deployment date/time for the virtual machine image. As such, remote invalidation may be a configured without requiring a change to the configured deployment date without departure from the scope of the present subject matter.

When a determination is made not to instruct the at least one other application server to perform remote invalidation of cache entries at decision point 440, or upon completion of instructing the at least one other application server to invalidate any cache entries that do not have a valid duration of at least the current deployment date/time at block 442, the process 400 returns to decision point 402 to await another request to create a virtual cache image.

As such, the process 400 creates virtual images and selectively records data elements to the virtual cache image based upon a valid duration (e.g., an expiration time) for each data element of at least the configured deployment date for the virtual machine image. The process 400 may further invalidate cache entries in response to a change in the configured deployment date and record entries to the cache image based upon the new changed configured deployment date. The process 400 may further store created JIT tables and shared classes caches to the virtual cache image for deployment. The process 400 deploys the virtual cache image as a virtual machine to one or more application servers and may instruct the servers to perform incremental invalidation of the virtual cache image in association with loading of the virtual cache image as a virtual machine on the respective application server. Many variations on the processing described are possible and all are considered within the scope of the present subject matter.

FIG. 5 is a flow chart of an example of an implementation of a process 500 for automated verification of performance for virtual image deployment with a warm cache. At decision point 502, the process 500 makes a determination as to whether a virtual image has been deployed. As such, the process 500 may begin execution upon completion of deployment of an image in association with the processing described above in association with FIG. 4. Alternatively, the process 500 may be incorporated into the processing described in association with FIG. 4 as appropriate for a given implementation.

When a determination is made that a virtual image has been deployed at decision point 502, the process 500 makes a determination at decision point 504 as to whether to determine performance of the deployed virtual image. The determination as to whether to determine performance of the deployed virtual image may be delayed to allow the virtual image to be loaded by the respective application server(s) or for other reasons as appropriate for a given implementation.

When a determination is made to determine performance of the deployed virtual image at decision point 504, the process 500 queries at least one other application server to which the virtual image was deployed for cache-hit performance data at block 506. At block 508, the process 500 receives the cache-hit performance data from the at least one other application server.

At decision point 510, the process 500 makes a determination as to whether the received cache-hit performance data meets anticipated cache deployment performance for the virtual machine image. Cache-hit performance may be measured by a number of cache hits versus a number of cache misses, by statistical cache-hit versus cache-miss calculations, or by any other approach as appropriate for a given implementation.

When a determination is made at decision point 510 that the received cache-hit performance data meets the anticipated cache deployment performance for the virtual machine image, the process 500 returns to decision point 502 to await deployment of a new virtual cache image. When a determination is made at decision point 510 that the received cache-hit performance data does not meet the anticipated cache deployment performance for the virtual machine image, the process 500 makes a determination at decision point 512 as to whether to delay for a duration of time and recheck the performance of the deployed virtual cache image.

When a determination is made at decision point 512 to delay for a duration of time and recheck the performance of the deployed virtual cache image, the process 500 returns to decision point 504 to make the determination as to whether to determine performance of the deployed virtual image, and iterates as described above. When a determination is made at decision point 512 not to delay for a duration of time and not to recheck the performance of the deployed virtual cache image, the process 500 modifies the automated virtual cache image population processing at block 514. As described above, virtual cache image population processing may include loading the virtual cache image with a known or intended data set for deployment to create a virtual cache image with a pre-populated set of cache data and may include applying a real user load to the virtual cache image to populate the virtual cache image. Many other possibilities exist for populating the virtual cache image and all are considered within the scope of the present subject matter. Additionally, an automated memory access script may be used to populate the virtual cache image. Accordingly, the process 500 may modify the chosen automated virtual cache image population processing as appropriate for a given implementation.

The process 500 makes a determination at decision point 516 as to whether to initiate a rebuild of the virtual cache image. A rebuild of the virtual cache image may include initiating a process, such as the processing described above in association with FIG. 4, or iterating processing associated with a combined process as appropriate for a given implementation. When a determination is made at decision point 516 to initiate a rebuild of the virtual cache image, the process 500 triggers a rebuild of the virtual cache image at block 518. When a determination is made at decision point 516 not to initiate a rebuild of the virtual cache image, or upon completion of triggering a rebuild of the virtual cache image at block 518, the process 500 returns to decision point 502 to await deployment of a new virtual cache image.

As such, the process 500 queries application servers for cache-hit performance data and determines whether cache-hit performance data received from the respective application(s) meets anticipated performance criteria for the deployed virtual cache image. The process 500 also modifies an automated memory access in response to determining that the deployed performance of the virtual cache image is other than anticipated. The process 500 may further initiate a rebuild and redeployment of the virtual cache image.

As described above in association with FIG. 1 through FIG. 5, the example systems and processes provide automated virtual image deployment with a warm cache. Many other variations and additional activities associated with automated virtual image deployment with a warm cache are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   a memory; and
   a processor associated with an application server programmed to:
   configure a future deployment date for a virtual machine image;
   determine, prior to the configured future deployment date, a selected subset of available cache entries with valid durations of at least the configured future deployment date for the virtual machine image, where each of the available cache entries corresponds with a valid duration;
   prepare a cache image within the memory comprising only the determined selected subset of the available cache entries with the valid durations of at least the configured future deployment date for the virtual machine image; and
   deploy the virtual machine image to at least one other application server as a virtual machine with the cache image comprising only the determined selected subset of the available cache entries with the valid durations of at least the configured future deployment date for the virtual machine image.

2. The system of claim 1, where, in being programmed to prepare the cache image within the memory comprising only the determined selected subset of the available cache entries with the valid durations of at least the configured future deployment date for the virtual machine image, the processor is programmed to:
   populate the cache image via memory access operations for selected data accesses associated with the virtual machine image;
   determine, for each memory access operation, whether each data element accessed by each memory access operation comprises a valid duration of at least the configured future deployment date for the virtual machine image; and
   store within the cache image only the data elements determined to have the valid duration of at least the configured future deployment date for the virtual machine image.

3. The system of claim 1, where, in being programmed to prepare the cache image within the memory comprising only the determined selected subset of the available cache entries with the valid durations of at least the configured future deployment date for the virtual machine image, the processor is programmed to:
   store within the cache image only data elements determined to have a valid duration of at least the configured future deployment date for the virtual machine image; and
   index each of the stored cache entries with an expiration date representing the valid duration associated with each of the cache entries.

4. The system of claim 1, where the processor is further programmed to:
   determine that the configured future deployment date for the virtual machine image has changed;
   determine the valid duration associated with each cache entry within the cache image; and
   delete any of the cached entries determined not to have a valid duration of at least the changed configured future deployment date for the virtual machine image; and
   where, in being programmed to deploy the virtual machine image to the at least one other application server as the virtual machine with the cache image comprising only the determined selected subset of the available cache entries with the valid durations of at least the configured future deployment date for the virtual machine image, the processor is programmed to deploy the virtual machine image to the at least one other application server as the virtual machine with the cache image comprising only the determined selected subset of the available cache entries with the valid durations of at least the changed configured future deployment date for the virtual machine image.

5. The system of claim1, where the processor is further programmed to:
   determine that the configured future deployment date for the virtual machine image has changed; and
   instruct the at least one other application server to invalidate any cache entries that do not have a valid duration of at least the changed configured future deployment date for the virtual machine image.

6. The system of claim 1, where the processor is further programmed to:
   configure the cache image to store at least one of a just-in-time (JIT) table and a shared classes cache; and
   store the at least one of the JIT table and the shared classes cache to the cache image; and
   where, in being programmed to deploy the virtual machine image to the at least one other application server as the virtual machine with the cache image comprising only the determined selected subset of the available cache entries with the valid durations of at least the configured future deployment date for the virtual machine image, the processor is programmed to deploy the virtual image to the at least one other application server as the virtual machine with the cache image comprising only the determined selected subset of the available cache entries with the valid durations of at least the configured future deployment date for the virtual machine image and the at least one of the JIT table and the shared classes cache.

7. The system of claim 1, where the processor is further programmed to:
   query the at least one other application server for cache-hit performance data;
   receive the cache-hit performance data from the at least one other application server; and upon a determination that the cache-hit performance data does not meet anticipated cache deployment performance for the virtual machine image, modify automated cache image population processing that performs memory access operations for selected data accesses associated with the virtual machine image.

8. A computer program product comprising a non-transitory computer readable storage medium including computer readable program code, where the computer readable program code when executed on a computer causes the computer to:
configure a future deployment date for a virtual machine image;
determine, prior to the configured future deployment date, a selected subset of available cache entries with valid durations of at least the configured future deployment date for the virtual machine image, where each of the available cache entries corresponds with a valid duration;
prepare a cache image comprising only the determined selected subset of the available cache entries with the valid durations of at least the configured future deployment date for the virtual machine image; and
the virtual machine image to at least one other computer as a virtual machine with the cache image comprising only the determined selected subset of the available cache entries with the valid durations of at least the configured future deployment date for the virtual machine image.

9. The computer program product of claim 8, where, in causing the computer to prepare the cache image comprising only the determined selected subset of the available cache entries with the valid durations of at least the configured future deployment date for a virtual machine image, the computer readable program when executed on the computer causes the computer to:
populate the cache image via memory access operations for selected data accesses associated with the virtual machine image;
determine, for each memory access operation, whether each data element accessed by each memory access operation comprises a valid duration of at least the configured future deployment date for the virtual machine image; and
store within the cache image only the data elements determined to have the valid duration of at least the configured future deployment date for the virtual machine image.

10. The computer program product of claim 8, where, in causing the computer to prepare the cache image comprising only the determined selected subset of the available cache entries with the valid durations of at least the configured future deployment date for a virtual machine image, the computer readable program when executed on the computer causes the computer to:
store within the cache image only data elements determined to have a valid duration of at least the configured future deployment date for the virtual machine image; and
index each of the stored cache entries with an expiration date representing the valid duration associated with each of the cache entries.

11. The computer program product of claim 8, where the computer readable program code when executed on the computer further causes the computer to:
determine that the configured future deployment date for the virtual machine image has changed;

determine the valid duration associated with each cache entry within the cache image; and
delete any of the cached entries determined not to have a valid duration of at least the changed configured future deployment date for the virtual machine image; and
where, in causing the computer to deploy the virtual machine image to the at least one other computer as the virtual machine with the cache image comprising only the determined selected subset of the available cache entries with the valid durations of at least the configured future deployment date for the virtual machine image, the computer readable program when executed on the computer causes the computer to deploy the virtual machine image to the at least one other computer as the virtual machine with the cache image comprising only the determined selected subset of the available cache entries with the valid durations of at least the changed configured future deployment date for the virtual machine image.

12. The computer program product of claim 8, where the computer readable program code when executed on the computer further causes the computer to:
determine that the configured future deployment date for the virtual machine image has changed; and
instruct the at least one other computer to invalidate any cache entries that do not have a valid duration of at least the changed configured future deployment date for the virtual machine image.

13. The computer program product of claim 8, where the computer readable program code when executed on the computer further causes the computer to:
configure the cache image to store at least one of a just-in-time (JIT) table and a shared classes cache; and
store the at least one of the JIT table and the shared classes cache to the cache image; and
where, in causing the computer to deploy the virtual machine image to the at least one other computer as the virtual machine with the cache image comprising only the determined selected subset of the available cache entries with the valid durations of at least the configured future deployment date for the virtual machine image, the computer readable program when executed on the computer causes the computer to deploy the virtual image to the at least one other computer as the virtual machine with the cache image comprising only the determined selected subset of the available cache entries with the valid durations of at least the configured future deployment date for the virtual machine image and the at least one of the JIT table and the shared classes cache.

14. The computer program product of claim 8, where the computer readable program code when executed on the computer further causes the computer to:
query the at least one other computer for cache-hit performance data;
receive the cache-hit performance data from the at least one other computer; and
upon a determination that the cache-hit performance data does not meet anticipated cache deployment performance for the virtual machine image, modify automated cache image population processing that performs memory access operations for selected data accesses associated with the virtual machine image.

15. A method, comprising:
configuring a future deployment date for a virtual machine image;
determining, prior to the configured future deployment date, a selected subset of available cache entries with valid durations of at least the configured future deployment date for the virtual machine image, where each of the available cache entries corresponds with a valid duration;

preparing, via an application server for the virtual machine image, a cache image comprising only the determined selected subset of the available cache entries with the valid durations of at least the configured future deployment date for the virtual machine image; and deploying the virtual machine image to at least one other application server as a virtual machine with the cache image comprising only the determined selected subset of the available cache entries with the valid durations of at least the configured future deployment date for the virtual machine image.

16. The method of claim 15, where preparing, via the application server for the virtual machine image, the cache image comprising only the determined selected subset of the available cache entries with the valid durations of at least the configured future deployment date for the virtual machine image comprises:

populating the cache image via memory access operations for selected data accesses associated with the virtual machine image;

determining, for each memory access operation, whether each data element accessed by each memory access operation comprises a valid duration of at least the configured future deployment date for the virtual machine image; and storing within the cache image only the data elements determined to have the valid duration of at least the configured future deployment date for the virtual machine image.

17. The method of claim 15, where preparing, via the application server for the virtual machine image, the cache image comprising only the determined selected subset of the available cache entries with the valid durations of at least the configured future deployment date for the virtual machine image comprises:

storing within the cache image only data elements determined to have a valid duration of at least the configured future deployment date for the virtual machine image; and indexing each of the stored cache entries with an expiration date representing the valid duration associated with each of the cache entries.

18. The method of claim 15, further comprising:

determining that the configured future deployment date for the virtual machine image has changed; and instructing the at least one other application server to invalidate any cache entries that do not have a valid duration of at least the changed configured future deployment date for the virtual machine image.

19. The method of claim 15, further comprising:

configuring the cache image to store at least one of a just-in-time (JIT) table and a shared classes cache; and storing the at least one of the JIT table and the shared classes cache to the cache image; and where deploying the virtual machine image to the at least one other application server as the virtual machine with the cache image comprising only the determined selected subset of the available cache entries with the valid durations of at least the configured future deployment date for the virtual machine image comprises deploying the virtual image to the at least one other application server as the virtual machine with the cache image comprising only the determined selected subset of the available cache entries with the valid durations of at least the configured future deployment date for the virtual machine image and the at least one of the JIT table and the shared classes cache.

20. The method of claim 15, further comprising:

querying the at least one other application server for cache-hit performance data;

receiving the cache-hit performance data from the at least one other application server; and upon a determination that the cache-hit performance data does not meet anticipated cache deployment performance for the virtual machine image, modifying automated cache image population processing that performs memory access operations for selected data accesses associated with the virtual machine image.

* * * * *